United States Patent
Hall

(10) Patent No.: US 9,341,087 B2
(45) Date of Patent: May 17, 2016

(54) ARRANGEMENT AND METHOD FOR CONVERTING THERMAL ENERGY TO MECHANICAL ENERGY

(75) Inventor: Ola Hall, Stockholm (SE)

(73) Assignee: SCANIA CV AB (SE)

(*) Notice: Subject to any disclaimer, the term of this patent is extended or adjusted under 35 U.S.C. 154(b) by 141 days.

(21) Appl. No.: 13/990,065

(22) PCT Filed: Nov. 22, 2011

(86) PCT No.: PCT/SE2011/051398
§ 371 (c)(1),
(2), (4) Date: Jun. 26, 2013

(87) PCT Pub. No.: WO2012/074456
PCT Pub. Date: Jun. 7, 2012

(65) Prior Publication Data
US 2013/0263594 A1     Oct. 10, 2013

(30) Foreign Application Priority Data
Dec. 1, 2010 (SE) ........................ 1051270

(51) Int. Cl.
*F01K 25/06* (2006.01)
*F01K 23/06* (2006.01)
(Continued)

(52) U.S. Cl.
CPC ............. *F01K 23/065* (2013.01); *F01K 13/00* (2013.01); *F01K 23/101* (2013.01); *F01K 25/06* (2013.01); *F01N 5/02* (2013.01); *F02G 5/02* (2013.01); *Y02T 10/16* (2013.01); *Y02T 10/166* (2013.01)

(58) Field of Classification Search
CPC ..... F01K 13/00; F01K 23/065; F01K 23/101; F01K 25/06; F01K 25/065; F01K 25/08; F01K 25/106; F02G 5/02; Y02T 10/16; Y02T 10/166

USPC .......... 60/614–618, 649, 651, 660, 661, 663, 60/671, 371, 624, 652, 662, 667
See application file for complete search history.

(56) References Cited

U.S. PATENT DOCUMENTS 3,125,073 A  *  3/1964  Profos ..................... F22B 29/08
                                                                          122/379
3,163,991 A  *  1/1965  Detlev ...................... F01K 3/22
                                                                          122/1 R
(Continued)

FOREIGN PATENT DOCUMENTS

JP      60-069220        4/1985
JP      60069220 A  *    4/1985  .............. F01K 23/10
(Continued)

OTHER PUBLICATIONS

International Search Report dated Mar. 5, 2012 issued in corresponding International Patent Application No. PCT/SE2011/051398.
(Continued)

*Primary Examiner* — Jesse Bogue
*Assistant Examiner* — Laert Dounis
(74) *Attorney, Agent, or Firm* — Ostrolenk Faber LLP

(57) ABSTRACT

An arrangement and a method for converting thermal energy to mechanical energy. The arrangement has a line circuit (3), circulation device (4) for circulating a zeotropic refrigerant mixture in the line circuit (3), an evaporator (6) in which the refrigerant mixture is vaporized by a heat source (7), a turbine (9) driven by the vaporized refrigerant mixture, and a condenser (12) which cools the refrigerant mixture so that it condenses. A control unit assesses whether the refrigerant mixture does not become fully vaporized in the evaporator (6) and, leads incompletely vaporized refrigerant mixture leaving the evaporator to a separating device (14) in which a liquid portion of the refrigerant mixture is separated from the gaseous portion, after which only the gaseous portion proceeds towards the turbine (9).

10 Claims, 2 Drawing Sheets

(51) Int. Cl.
*F01K 23/10* (2006.01)
*F01N 5/02* (2006.01)
*F02G 5/02* (2006.01)
*F01K 13/00* (2006.01)

(56) References Cited

U.S. PATENT DOCUMENTS

| | | | | |
|---|---|---|---|---|
| 3,411,300 | A * | 11/1968 | Schuetzenduebel | F22B 35/105 122/406.4 |
| 3,747,333 | A * | 7/1973 | Gerstmann | F01K 13/006 137/341 |
| 4,422,297 | A * | 12/1983 | Rojey | 60/651 |
| 4,733,536 | A * | 3/1988 | DiBella et al. | 60/618 |
| 4,779,424 | A * | 10/1988 | Sumitomo et al. | 60/649 |
| 6,250,258 | B1 * | 6/2001 | Liebig | 122/406.5 |
| 7,594,399 | B2 * | 9/2009 | Lehar et al. | 60/649 |
| 8,739,538 | B2 * | 6/2014 | Myers et al. | 60/670 |
| 8,839,622 | B2 * | 9/2014 | Myers et al. | 60/670 |
| 2008/0289313 | A1 * | 11/2008 | Batscha et al. | 60/39.5 |
| 2010/0212304 | A1 | 8/2010 | Hoetger | |
| 2011/0265476 | A1 * | 11/2011 | Berger et al. | 60/651 |
| 2013/0213040 | A1 * | 8/2013 | Goswami et al. | 60/647 |

FOREIGN PATENT DOCUMENTS

| | | | | |
|---|---|---|---|---|
| JP | 3018656 | A | | 9/1995 |
| JP | 08144850 | A * | 6/1996 | F02G 5/04 |
| JP | 2008231981 | A * | 10/2008 | |
| SE | 533 402 | C2 | | 9/2010 |

OTHER PUBLICATIONS

International Preliminary Report on Patentability dated Mar. 27, 2013 issued in corresponding International Patent Application No. PCT/SE2011/051398.

Bombarado P. et al., "Heat Recovery from Diesel engines: A thermo-dynamic comparison between Kalina and ORC cycles" Applied Thermal Engineering, Aug. 23, 2009.

* cited by examiner

ARRANGEMENT AND METHOD FOR CONVERTING THERMAL ENERGY TO MECHANICAL ENERGY

CROSS-REFERENCE TO RELATED APPLICATIONS

The present application is a 35 U.S.C. §§371 national phase conversion of PCT/SE2011/051398, filed Nov. 22, 2011, which claims priority of Swedish Application No.1051270-5, filed Dec. 1, 2010, the contents of which are incorporated by reference herein. The PCT International Application was published in the English language.

BACKGROUND TO THE INVENTION AND PRIOR ART

The present invention relates to an arrangement and a method for converting thermal energy to mechanical energy.

When fuel is burnt in a combustion engine in a vehicle, chemical energy is converted to mechanical energy to propel the vehicle. However, a substantial part of the chemical energy is converted to thermal energy which is released to the surroundings in various ways. An example of this is the thermal energy in the exhaust gases which are discharged to the surroundings. Another example is the thermal energy present in various kinds of warm media in the vehicle which is actively cooled away in various types of cooling devices. An example of such warm media is the coolant in cooling systems which cool the engine and possibly other components of the vehicle. The warm coolant is usually cooled in a radiator by surrounding air at the front portion of the vehicle. Many combustion engines are supercharged, which entails compressed air being supplied to them. The charge air is cooled in at least one charge air cooler before being led into the engine. To reduce discharges of nitrogen oxides, part of the exhaust gases may be recirculated. The recirculating exhaust gases are cooled in at least one EGR cooler before being mixed with the charge air and led into the engine etc.

WHR (waste heat recovery) systems are used to convert the thermal energy to mechanical energy. A WHR system comprises a circuit with a pump which circulates a medium in a line circuit. The line circuit comprises an evaporator in which the medium is vaporised by heat from a heat source, and a turbine which is driven by the vaporised medium. When the medium expands through the turbine, part of the medium's thermal energy is converted to mechanical energy. This mechanical energy may be utilised for various operating purposes or be converted to electrical energy.

WHR systems are so dimensioned as to be of high efficiency at a certain load. Where a heat source with a varying temperature is used, the load is not always within the range in which the WHR system is at its greatest efficiency. Conventional WHR systems are therefore not particularly effective when taking thermal energy from heat sources which have varying temperatures.

JP 08144850 refers to a system for recovery of thermal energy from exhaust gases. The system comprises a line circuit with circulating mixtures of water and ammonia. The system comprises a high-pressure turbine and a low-pressure turbine to extract mechanical energy from the exhaust gases in different operating states in which the exhaust gases are at varying temperatures. This system is complicated and expensive to manufacture.

SUMMARY OF THE INVENTION

The object of the present invention is to propose an arrangement capable of converting thermal energy from a heat source to mechanical energy in an effective way even at times when the heat source is at a low temperature.

This object is achieved with the arrangement characterised by the features indicated herein. According to the invention, a zeotropic refrigerant mixture is circulated in the line circuit. At times when the heat source is at a low temperature, the refrigerant mixture does not become fully vaporised in the evaporator. In this situation the refrigerant mixture is led to a separating device which separates the portion of the refrigerant mixture which is in liquid form from that which is in gaseous form. The portion of the refrigerant mixture which is in gaseous form is then led back to the line circuit for continued circulation, while the portion of the refrigerant mixture which is in liquid form remains in the separating device. As the refrigerant mixture comprises two refrigerants with different vaporisation temperatures, the first refrigerant which has the higher vaporisation temperature will remain substantially in liquid form, whereas the second refrigerant which has the lower vaporisation temperature changes substantially to gaseous form in the evaporator. This causes the refrigerant mixture which circulates in the line to contain an increasing proportion of the second refrigerant. So long as the refrigerant mixture does not become fully vaporised in the refrigerant mixture, its content of the first refrigerant will decrease. This leads to the refrigerant mixture becoming vaporised at a progressively lower temperature until all of it becomes vaporised in the evaporator. This results in an optimum amount of gaseous medium which can generate mechanical energy in the turbine. According to the invention, the composition of the refrigerant mixture is thus modified and consequently its vaporisation temperature automatically drops to a lower value when the heat source is at a low temperature. This makes it possible for mechanical energy to be extracted from the heat source in an effective way even at times when it is at a low temperature. With a zeotropic refrigerant mixture the mass flow is not entirely dependent on available temperature, since the mass flow can to some extent be controlled, for optimum turbine efficiency, by altering the composition of the refrigerant mixture.

According to a preferred embodiment of the present invention, a control means comprises a control unit adapted to receiving information from at least one sensor which monitors a parameter on the basis of which the control unit assesses whether the refrigerant mixture does or does not become fully vaporised in the evaporator. The control unit may be a computer unit with suitable software for this purpose. The sensor may be adapted to monitoring the temperature and/or pressure of the refrigerant in the evaporator or at a location in the line circuit substantially immediately downstream of the evaporator. On the basis of knowing the pressure and temperature of the refrigerant, the control unit can assess whether the whole of the refrigerant mixture does or does not become vaporised in the evaporator. It can assess this on the basis of stored information about the refrigerant mixture used. Alternatively it may receive information from a sensor which detects a parameter by which the current supply of thermal energy from the heat source to the evaporator can be estimated.

According to another preferred embodiment of the present invention, said control means is able to put the arrangement into a high-effect state and a low-effect state at times when it assesses that the refrigerant mixture is not being fully vaporised in the evaporator. In the high-effect state a refrigerant mixture containing a suitable amount of the first refrigerant and the second refrigerant is circulated through the line circuit.

In the low-effect state the first refrigerant which has the higher vaporisation temperature is separated from the refrigerant mixture. The refrigerant mixture which circulates in the line circuit thus assumes a different composition and lower vaporisation temperature such that it can become fully vaporised even when the heat source is at a low temperature. When the temperature of the heat source rises again, the arrangement is put into high-effect state, in which the separated first refrigerant is led back to the line circuit so that the refrigerant mixture assumes a raised vaporisation temperature.

According to another embodiment of the present invention, said control means is adapted to leading the refrigerant mixture from the evaporator through an ordinary line section of the line circuit when the arrangement is in high-effect state and through an extra line section of the line circuit which comprises the separate device when the arrangement is in low-effect state. In this case there is no need for the refrigerant mixture to pass through the separating device when the arrangement is in high-effect state. Said control means may comprise a valve arrangement which leads the refrigerant mixture through the ordinary line section or the extra line section. This makes it easy for the refrigerant mixture to be led through either of said line sections depending on whether the arrangement is in high-effect or low-effect state.

According to an embodiment of the present invention the separating device comprises a container in which refrigerant mixture in liquid form is separated from refrigerant mixture in gaseous form. A liquid is substantially always at a higher density than a gas. The portion of the refrigerant mixture which is in liquid form will in this case accumulate on a bottom surface in the container, while the portion of the refrigerant mixture which is in gaseous form will accumulate above the liquid level in the container. The arrangement may comprise a first line adapted to receiving refrigerant mixture from the evaporator and to leading it into the container at a location above a maximum liquid level, and a second line adapted to receiving gaseous refrigerant mixture at a location above the maximum liquid level in the container and to leading the gaseous refrigerant mixture back from the container to the line circuit. In this case liquid medium thus remains in a lower portion of the container, while gaseous medium is led back to the line circuit for continued circulation from an upper portion of the container. The arrangement comprises with advantage a third line extending between a bottom surface in the container and the line circuit, and flow means by which it is possible at appropriate times to lead back to the line circuit refrigerant mixture in liquid form which has accumulated in the container. When the arrangement is in high-effect state, it is appropriate to lead back the refrigerant mixture in liquid form which has accumulated in the separating device. This may be done in suitable amounts so that the refrigerant mixture circulating in the line circuit will contain the two refrigerants in the same proportions throughout the line circuit.

According to an embodiment of the present invention, said heat source is a warm medium in a vehicle powered by a combustion engine. In vehicles there are many media which may serve as heat source for the aforesaid arrangement. The engine's exhaust gases are such a heat source. Other possible heat sources comprise the coolant which circulates in the vehicle's cooling system. Further possible heat sources are charge air and recirculating exhaust gases which are led to the engine. The flow and temperature of these media vary in different operating states of the engine. The arrangement defined above makes it possible for a turbine to achieve substantially optimum running even when the flow and temperature of the aforesaid media are low.

The object mentioned in the introduction is also achieved with the method according to the invention. The method comprises the steps of assessing whether the refrigerant mixture does not become fully vaporised in the evaporator and, when such is the case, of leading the incompletely vaporised refrigerant mixture leaving the evaporator to a separating device in which the portion of the refrigerant mixture which is in liquid form is separated from the portion of the refrigerant mixture which is in gaseous form, after which only the gaseous portion of the refrigerant mixture proceeds towards the turbine in the line circuit. The composition and vaporisation temperature of the refrigerant mixture will thus be adjusted to a lower value at times when the heat source is at a low temperature. This makes it possible for mechanical energy to be extracted from the heat source in an effective way even when it is at a low temperature.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE INVENTION

Figure 1:
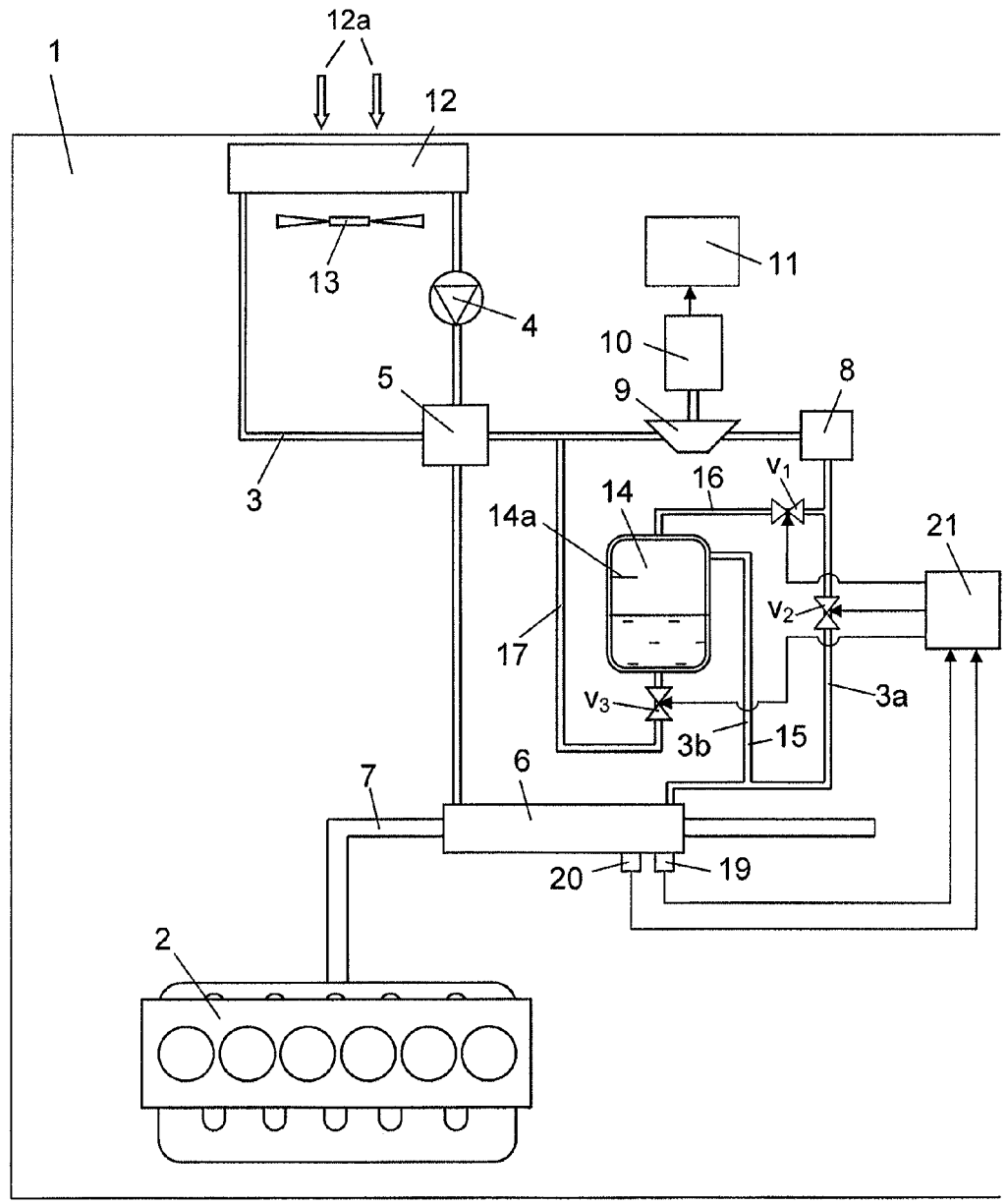
FIG. 1 depicts an arrangement for conversion of thermal energy to mechanical energy and FIG. 2 is a flowchart illustrating a method for operating the arrangement in FIG. 1.

FIG. 1 depicts schematically a vehicle 1 equipped with an arrangement for converting thermal energy in exhaust gases discharged from a combustion engine 2 to mechanical energy. The arrangement comprises a line circuit 3 with a pump 4 adapted to pressurising and circulating a zeotropic refrigerant mixture in the line circuit 3. A zeotropic refrigerant mixture is made up of a first refrigerant and a second refrigerant. The first refrigerant vaporises in this case at a higher temperature than the second refrigerant at similar pressure. The refrigerants may be fluorinating refrigerants, ethanol, water or some other refrigerant with suitable characteristics. The phase change of a zeotropic refrigerant mixture takes place within a temperature range but at a constant pressure. By altering the proportions of the refrigerants in the zeotropic refrigerant mixture it is possible to vary the temperature range and the pressure at which the phase change takes place.

The refrigerant mixture in the line circuit 3 is led by the pump 4 to a heat exchanger 5 which may be a so-called recuperator. The refrigerant mixture is led from the heat exchanger 5 to an evaporator 6. The refrigerant mixture is warmed in the evaporator 6 by exhaust gases which pass through an exhaust line 7 of the engine 2. The temperature and flow of the exhaust gases in the exhaust line 7 vary with the load upon the engine 2. If the engine 2 is a diesel engine, the temperature of the exhaust gases may be up to about 600-700° C. when there is heavy load upon the engine 2. The refrigerant mixture is intended to be warmed in the evaporator 6 to a temperature at which it vaporises. The gaseous refrigerant mixture leaving the evaporator 6 is led to a supplementary heater 8. Where necessary, the refrigerant mixture may here undergo extra warming to ensure that all of it is in gaseous form when it reaches a turbine 9. The refrigerant mixture then expands through the turbine 9. Part of the thermal energy in the refrigerant mixture is here converted to mechanical energy. The turbine 9 drives in this case a generator 10 which converts the mechanical energy to electrical energy.

The electrical energy is stored in an energy store 11. The stored electrical energy in the energy store 11 may with advantage be used for propulsion of the vehicle 1 or to operate components of the vehicle 1. Alternatively, the turbine 9 may be connected to a flywheel or similar mechanical energy storage unit which is connectable to the vehicle's power train. When the flywheel is connected to the power train, the vehicle 1 is provided with extra propulsive power.

When the gaseous refrigerant mixture has expanded in the turbine 9, it will be at a lower pressure and a lower temperature. The refrigerant mixture is then led through the heat exchanger 5 in which it is cooled by the liquid refrigerant mixture from the pump 4. The gaseous refrigerant mixture is thereafter led to a condenser 12 in which it is cooled to a temperature at which it condenses. In the example depicted, the refrigerant mixture is cooled in the condenser 12 by air at the temperature of the surroundings. The surrounding air represented by arrows 12a is drawn through the condenser 12 by an air fan 13. The gaseous refrigerant mixture thus changes to liquid in the condenser 12. The resulting liquid refrigerant mixture is drawn from the condenser 12 to the pump 4. The liquid refrigerant mixture reaching the heat exchanger 5 will thus be at a lower temperature than the gaseous refrigerant mixture which has passed through the heat exchanger 5 at a location upstream of the condenser 12. The liquid refrigerant mixture thus undergoes warming in the heat exchanger 5 before it reaches the evaporator 6.

The circulating refrigerant mixture undergoes a pressure drop when it expands through the turbine 9. The pump 4 which circulates the refrigerant mixture through the line circuit 3 imparts a corresponding pressure rise to the refrigerant mixture. The refrigerant will thus be at a higher pressure in the portion of the line circuit 3 which extends from the pump 4 to the turbine 9 than in the portion of the line circuit 3 which extends from the turbine 9 to the pump 4 with respect to the direction of refrigerant mixture circulation in the line circuit 3. The turbine 9 thus makes it possible for thermal energy from exhaust gases in the exhaust line 7 to be utilised and be converted to mechanical energy. The mechanical energy is thereafter converted to electrical energy in the generator 10. Using the electrical energy for propulsion makes it possible for the vehicle 1 to acquire more capacity without any supply of extra fuel to the engine 2.

In addition to the components described above, the arrangement comprises also a container 14 for separation of liquid from gas. The container 14 has a maximum liquid level 14a. The maximum liquid level 14a may be a value corresponding to a situation in which the whole of the first refrigerant has accumulated in liquid form in the container 14. The container 14 is situated in an extra line section 3b of the line circuit 3. The extra line section has an extent parallel to the ordinary line section 3a of the line circuit 3. The extra line section 3b comprises a first line 15 extending between an inlet aperture in the line circuit 3 and an outlet aperture in the container 14. The inlet aperture of the first line 15 is situated substantially immediately downstream of the evaporator 6. The outlet aperture of the first line 15 is situated above the container's maximum liquid level 14a. The extra line section 3b comprises a second line 16 extending between an inlet aperture in the container 14 and an outlet aperture in the line circuit 3. The inlet aperture of the second line 16 is situated above the container's maximum liquid level 14a. The outlet aperture of the second line 16 is situated upstream of the supplementary heater 8. The second line 16 comprises a valve $v_1$ by which the flow through the second line 16 can be halted. The ordinary line section 3a has an extent between the inlet aperture of the first line 15 in the line circuit 3 and the outlet aperture of the second line in the line circuit 3. The ordinary line section 3a comprises a valve $v_2$ by which the flow through the ordinary line section 3a can be halted. The container 14 is connected to a third line 17 extending between an inlet aperture in the container 14 and an outlet aperture in the line circuit 3. The inlet aperture of the third line 17 is situated in a bottom surface in the container 14 and the outlet aperture is at a location downstream of the turbine 9 in the line circuit 3. The third line 17 comprises a valve $v_3$ which in an open state allows draining of liquid accumulated in the container 14. A temperature sensor 19 and a pressure sensor 20 are provided in the evaporator 6. A control unit 21 is adapted to receiving information from the temperature sensor 19 and the pressure sensor 20 during operation of the engine 2.

Different operating states of the engine 2 result in a varying flow of exhaust gases with a varying temperature in the exhaust line 7. Heavy load upon the engine 2 results in an abundant flow of exhaust gases at a high temperature through the exhaust line 7. In such operating states the turbine 9 can recover a relatively large amount of thermal energy from the exhaust gases. Low load upon the engine 2 results in a significantly smaller flow of exhaust gases at a lower temperature through the exhaust line 7. In such operating states the turbine 9 can recover significantly less thermal energy from the exhaust gases. However, it is desirable to recover as much thermal energy as possible from the exhaust gases in all operating states. For this to be possible, the thermal energy from the exhaust gases in the exhaust line 7 has to be able to warm the refrigerant mixture so that it becomes fully vaporised in the evaporator even when the exhaust gases are at a relatively low temperature.

According to the present invention, the control unit 21 can put the arrangement into a high-effect state H and a low-effect state L. In the high-effect state H the control unit 21 puts the valve $v_1$ into a closed state and the valve $v_2$ into an open state. This means that the refrigerant mixture led out from the evaporator 6 can be led directly to the supplementary heater 8 and the turbine 9 via the ordinary line section 3a of the line circuit 3. At the same time, the control unit 21 puts the valve $v_3$ into an open state so that any liquid which has accumulated in the container 14 can be led back to the line circuit 3 at a location downstream of the turbine 9. In the low-effect state L, the control unit 21 puts the valve $v_1$ into an open state and the valve $v_2$ into a closed state. This means that the refrigerant mixture led out from the evaporator 6 can only be led to the supplementary heater 8 and the turbine 9 via the extra line section 3b which thus comprises the first line 15, the container 14 and the second line 16.

Figure 2:
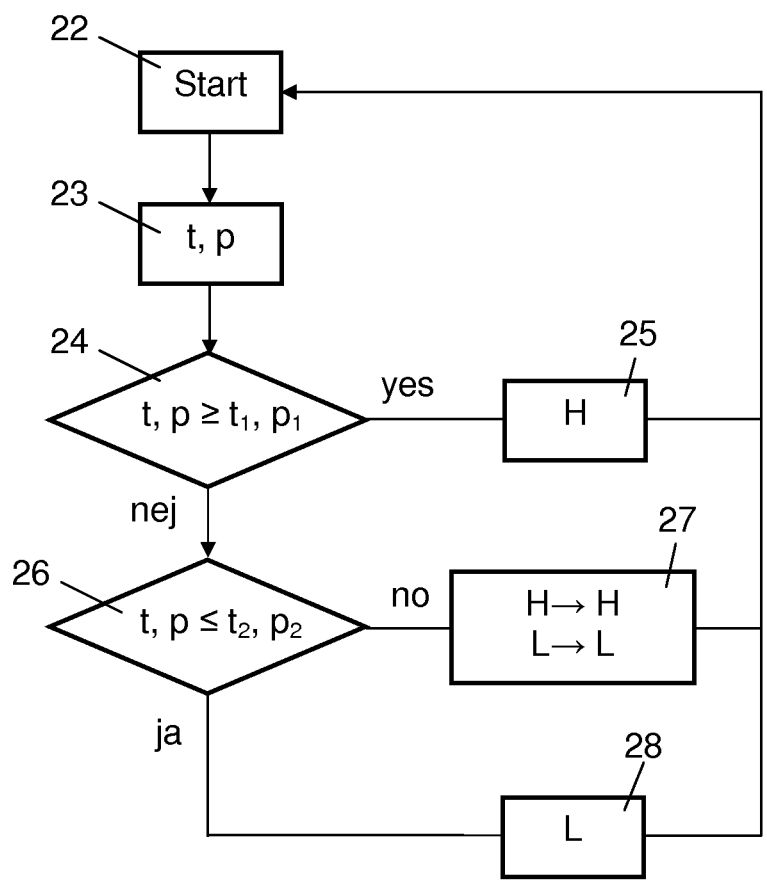

FIG. 2 is a flowchart illustrating a method during operation of the arrangement in FIG. 1. The method starts at step 22. Pertaining to operation, the control unit 21 receives at step 23 information from the temperature sensor 19 and the pressure sensor 20 about the temperature t and pressure p of the refrigerant mixture. At step 24 the control unit 21 compares the temperature t and pressure p with first threshold values $t_1$ and $p_1$. At the first threshold values $t_1$ and $p_1$ the whole refrigerant mixture becomes vaporised with a margin in the evaporator 6. If the temperature t and pressure p values received are greater than or equal to the first threshold values $t_1$ and $p_1$, the control unit 21 will find that there is no risk that refrigerant mixture in liquid form might leave the evaporator and be led to the turbine 9. In this situation, at step 25, the control unit 21 will put the arrangement into the high-effect state H. This means that the first valve $v_1$ is put into a closed state and the second valve $v_2$ into an open state and refrigerant mixture led out from the evaporator 6 can be led to the supplementary heater 8 and the turbine 9 via the ordinary line section 3a of the line circuit 3. The method then starts again at step 22.

If at step 24 the values received for temperature t and pressure p are lower than the first threshold values $t_1$ and $p_1$, the control unit 21 compares at step 26 the temperature t and pressure p values received with lower second threshold values $t_2$ and $p_2$. The second threshold values $t_2$ and $p_2$ serve as a lower limit value at which the whole refrigerant mixture undergoes full vaporisation in the evaporator 6. If the temperature t and pressure p values received are greater than or equal to the second threshold values $t_2$ and $p_2$, the control unit 21 will find that there is here again no risk that refrigerant mixture leaving the evaporator might contain liquid. To prevent the arrangement from switching too frequently between the high-effect state H and the low-effect state L, the control unit 21 will not alter the setting of the arrangement at step 27. Thus if the arrangement is already in a high-effect state H, it is allowed to remain in that state. If the arrangement is in a low-effect state L, it is allowed to remain in that state. The method then begins again at step 22.

If at step 26 the temperature t and pressure p values received are lower than the second threshold values $t_2$ and $p_2$, the control unit 21 will find that the refrigerant mixture leaving the evaporator 6 contains liquid. At step 28 the control unit 21 will put the arrangement into the low-effect state L in which the refrigerant mixture leaving the evaporator is led into the extra line section 3b. The refrigerant mixture is led through the first line 15 to the container 14. The portion of the refrigerant mixture which is in liquid form will be at a higher density than the portion of the refrigerant mixture which is in gaseous form. The portion of the refrigerant mixture which is in liquid form will therefore move down in the container 14 by force of gravity and accumulate on a bottom surface of the container 14. The portion of the refrigerant mixture which is in gaseous form will accumulate above the liquid surface in the container 14. The inlet aperture to the second line 16 will thus be above the maximum liquid level 14a in the container 14. The risk that refrigerant mixture in liquid form might be led to the turbine 9 is therefore eliminated. The portion of the refrigerant mixture which is in liquid form comprises substantially the first refrigerant which has the higher vaporisation temperature. The portion of the second refrigerant which has the lower vaporisation temperature in the refrigerant mixture circulating in the line circuit 3 will therefore increase. The changed mutual proportions of the two refrigerants will cause the temperature range within which the refrigerant mixture becomes vaporised to drop. Lowering the vaporisation temperature to a low enough level will enable the refrigerant mixture which circulates in the line circuit to become fully vaporised in the evaporator 6 even when the exhaust gases in the exhaust line 7 are at a low temperature. The method then starts again at step 22. When the temperature of the exhaust gases in the exhaust line 7 rises back to a high temperature, the control unit 21 will receive temperature t and pressure p values which indicate that at step 24 the arrangement has to be put into the high-effect state H. When this happens, the valve $v_3$ will open so that the liquid refrigerant mixture which has accumulated in the container 14 is led back to the line circuit 3. This may happen progressively as the two refrigerants become mixed in a substantially uniform way in the line circuit 3. When the proportion of the first refrigerant in the circulating refrigerant mixture increases, the vaporisation temperature of the mixture will rise again.

The invention is in no way restricted to the embodiment to which the drawing refers but may be varied freely within the scopes of the claims. In the embodiments depicted, the heat in exhaust gases is utilised as heat source to vaporise a refrigerant mixture and drive the turbine. It is nevertheless possible to use any desired heat sources to vaporise the refrigerant mixture in the evaporator 6. The arrangement is used with advantage for heat sources which have a varying thermal capacity and a need for cooling. Such heat sources may be coolant in the vehicle's cooling system, charge air led to supercharged combustion engines and recirculating exhaust gases.

The invention claimed is:

1. An arrangement for converting thermal energy to mechanical energy, the arrangement comprising:
    a line circuit;
    a pump configured for circulating a zeotropic refrigerant mixture in the line circuit;
    the zeotropic refrigerant mixture comprises a first refrigerant and a second refrigerant, wherein the first refrigerant has a higher vaporisation temperature than the second refrigerant at a similar pressure;
    an evaporator to which the refrigerant mixture is circulated and where the mixture is vaporised and a heat source for the evaporator and operative for vaporizing the refrigerant mixture;
    a turbine in the line circuit and located and configured to be driven by the vaporised refrigerant mixture;
    a condenser in which the refrigerant mixture is cooled so that the vaporised refrigerant mixture condenses;
    an electronic control unit configured for assessing whether the refrigerant mixture does not become fully vaporised at the evaporator and, when the control unit assesses that the refrigerant mixture is not fully vaporised, the control unit is configured to put the arrangement into a low-effect state, the low-effect state comprising the arrangement leading the incompletely vaporised refrigerant mixture through a first conduit leaving the evaporator;
    a gas/liquid separating device connected with the first conduit from the evaporator configured for separating a first portion of the refrigerant mixture, which is in liquid form, from a second portion of the refrigerant mixture, which is in gaseous form, wherein the separated liquid refrigerant mixture is prevented from leaving the separating device when the arrangement is in the low-effect state; and
    a second conduit for transmitting the gaseous portion of the refrigerant mixture from the separating device toward the turbine in the line circuit and when a temperature of the heat source rises back to a higher temperature, the control unit being configured to put the arrangement into a high-effect state, the high-effect state comprising the arrangement leading the separated liquid refrigerant mixture back to the line circuit,
    wherein the control unit is configured and operable to lead the refrigerant mixture from the evaporator towards the turbine through an ordinary line section of the line circuit bypassing the separating device when the control unit assesses that the arrangement is in the high-effect state, and through an extra line section of the line circuit which contains the separating device when the control unit assesses that the arrangement is in the low-effect state.

2. The arrangement according to claim 1, wherein the control unit comprises at least one sensor configured to monitor a parameter, and a controller configured for receiving information about the parameter from the at least one sensor on the basis of which the controller assesses whether the refrigerant mixture does or does not become fully vaporised in the evaporator.

3. The arrangement according to claim 2, further comprising sensors, including the at least one sensor, configured for monitoring temperature and/or pressure of the refrigerant in the evaporator or at a location in the line circuit downstream of the evaporator.

4. The arrangement according to claim 1, wherein the control unit comprises a valve arrangement configured to lead the refrigerant mixture selectively through the ordinary line section or through the extra line section.

5. The arrangement according to claim 1, wherein the separating device comprises a container in which the refrigerant mixture in liquid form is separated from the refrigerant mixture in gaseous form.

6. The arrangement according to claim 5, further comprising:
   a first line connected for receiving refrigerant mixture from the evaporator and for leading the refrigerant mixture from the evaporator into the container at a location above a maximum liquid level in the container and a second line connected for receiving gaseous refrigerant mixture at a location above the maximum liquid level in the container and for leading the gaseous refrigerant mixture back from the container to the line circuit.

7. The arrangement according to claim 6, further comprising a third line extending between a bottom surface in the container and the line circuit, and a valve operable at times to lead the refrigerant mixture in liquid form which has accumulated in the container back to the line circuit.

8. The arrangement according claim 1, wherein the heat source comprises a warm medium in a vehicle powered by a combustion engine.

9. A method for converting thermal energy to mechanical energy comprising:
   providing a line circuit for circulating a zeotropic refrigerant mixture in the line circuit, wherein the mixture contains a first refrigerant and a second refrigerant and the first refrigerant has a higher vaporisation temperature than the second refrigerant at a similar pressure;
   vaporizing the mixture in an evaporator via a heat source;
   driving a turbine by the vaporised refrigerant mixture, and then cooling the refrigerant mixture in a condenser so that the mixture condenses; and
   assessing whether the refrigerant mixture does not become fully vaporised in the evaporator and, when that occurs, leading the refrigerant mixture from the evaporator to a gas/liquid separating device and therein separating the portion of the refrigerant mixture which is in liquid form from the portion of the refrigerant mixture which is in gaseous form, then causing only the gaseous portion of the refrigerant mixture to proceed towards the turbine in the line circuit, and
   when the temperature of the heat source rises back to a higher temperature, leading the separated liquid refrigerant mixture back to the line circuit and leading the refrigerant mixture from the evaporator towards the turbine by bypassing the separating device.

10. An arrangement for converting thermal energy to mechanical energy, the arrangement comprising:
   a line circuit;
   a pump configured for circulating in the line circuit a zeotropic refrigerant mixture comprising a first refrigerant and a second refrigerant, wherein the first refrigerant has a higher vaporisation temperature than the second refrigerant at a similar pressure;
   an evaporator to which the refrigerant mixture is circulated and where the mixture is vaporised and a heat source for the evaporator;
   a turbine in the line circuit and located and configured to be driven by the vaporised refrigerant mixture;
   a condenser in which the refrigerant mixture is cooled so that the vaporised refrigerant mixture condenses;
   an electronic control unit configured for assessing whether the refrigerant mixture does not become fully vaporised at the evaporator and, when the control unit assesses that the refrigerant mixture is not fully vaporised, the control unit is configured to put the arrangement into a low-effect state in which the arrangement leads the incompletely vaporised refrigerant mixture through a first conduit leaving the evaporator;
   a gas/liquid separating device connected with the first conduit from the evaporator and configured for separating a first portion of the refrigerant mixture, which is in liquid form, from a second portion of the refrigerant mixture, which is in gaseous form, wherein the separated liquid refrigerant mixture is prevented from leaving the separating device when the arrangement is in the low-effect state; and
   a second conduit for transmitting the gaseous portion of the refrigerant mixture from the separating device toward the turbine in the line circuit and when a temperature of the heat source rises back to a higher temperature, the control unit is configured to put the arrangement into a high-effect state leading the separated liquid refrigerant mixture back to the line circuit,
   wherein the control unit is configured and operable to lead the refrigerant mixture from the evaporator towards the turbine through an ordinary line section of the line circuit bypassing the separating device when the control unit assesses that the arrangement is in the high-effect state, and through an extra line section of the line circuit which contains the separating device when the control unit assesses that arrangement is in the low-effect state.

* * * * *